United States Patent [19]

Orlando

[11] 4,425,731
[45] Jan. 17, 1984

[54] DISPOSABLE RODENT TRAP

[75] Inventor: Joseph Orlando, Mesa, Ariz.

[73] Assignee: Farnam Companies, Inc., Phoenix, Ariz.

[21] Appl. No.: 285,148

[22] Filed: Jul. 20, 1981

[51] Int. Cl.³ .......................................... A01M 23/00
[52] U.S. Cl. ........................................ 43/58; 43/114; 229/22
[58] Field of Search ................ 43/58, 114, 60, 61, 43/99, 121; 229/22; 206/45.15, 468

[56] References Cited

U.S. PATENT DOCUMENTS

| | | | |
|---|---|---|---|
| 1,804,891 | 5/1931 | Newman | 43/131 |
| 2,916,847 | 12/1959 | Murphy | 43/61 |
| 2,962,836 | 12/1960 | Hughes | 43/58 |
| 3,913,259 | 5/1973 | Nishimura et al. | 43/114 |
| 4,120,400 | 10/1978 | Kotyuk | 206/468 X |
| 4,208,828 | 6/1980 | Hall et al. | 43/114 |
| 4,231,180 | 11/1980 | Bare | 43/61 |
| 4,244,134 | 1/1981 | Otterson | 43/58 |
| 4,349,981 | 9/1982 | Sherman | 43/114 X |

Primary Examiner—Gene P. Crosby
Assistant Examiner—Charles L. Willis
Attorney, Agent, or Firm—LaValle D. Ptak

[57] ABSTRACT

A disposable rodent trap is fabricated in the form of a generally wedge-shaped enclosure from a single blank of pliable, bendable material. The right triangular ends each have an access opening formed through them at the corner adjacent the base. The back side wall is hinged at the top with the cover portion of the wedge and is bent inwardly to terminate in a moveable floor which has a transverse dimension less than the width of the main base of the trap. The moveable floor has a coating of adhesive material on it for trapping rodents. A provision is made for pulling the moveable floor toward the narrow interior portion of the wedge after a rodent is trapped to move the moveable floor and the back side wall to a position where the side wall is forward of the openings in the end walls for disposal of the trap and the rodent entrapped therein.

11 Claims, 6 Drawing Figures

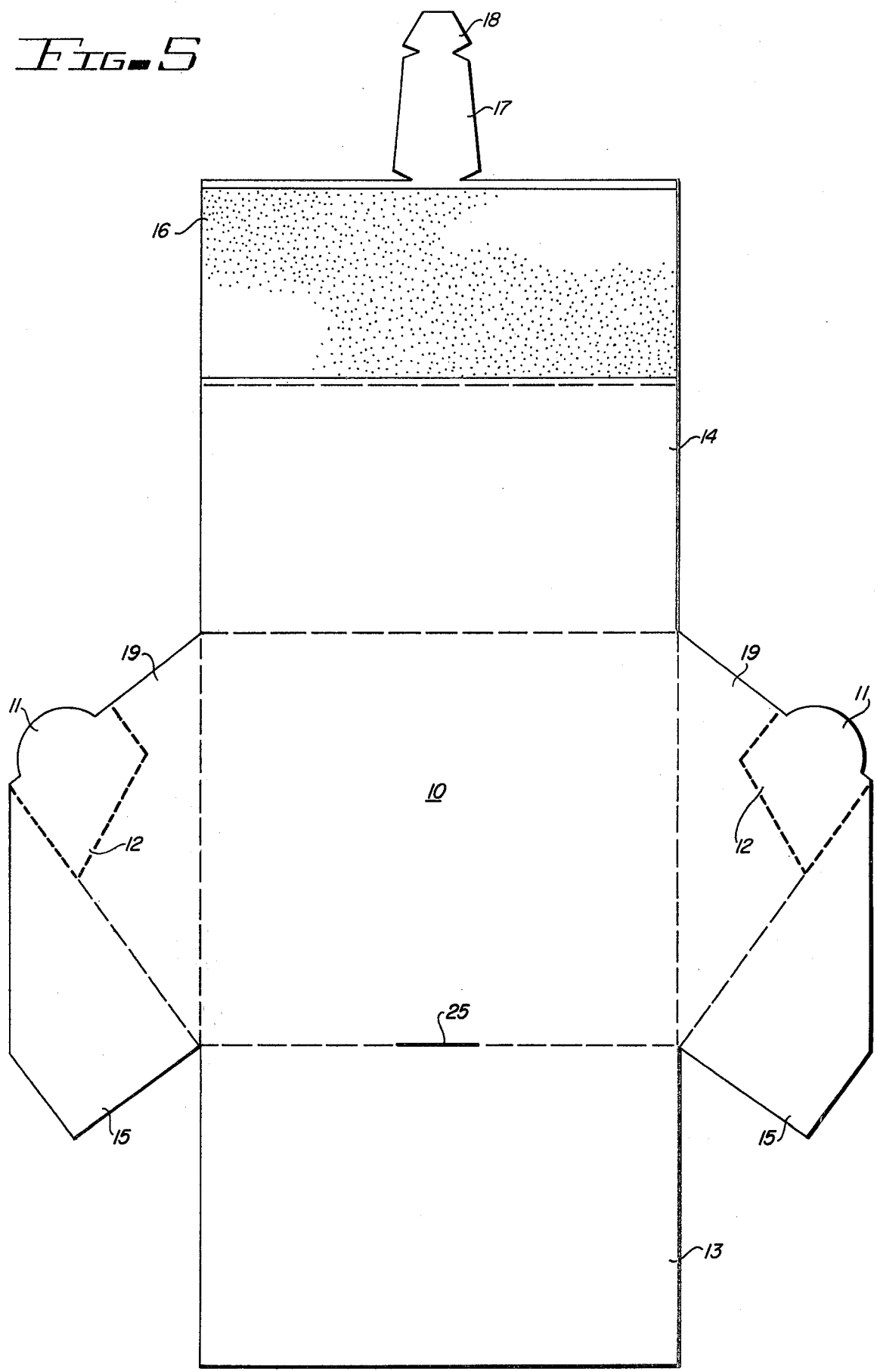

DISPOSABLE RODENT TRAP

BACKGROUND OF THE INVENTION

The elimination of rodents, such as mice and rats, and crawling insect pests, such as cockroaches, from living areas and livestock barns is highly desirable. A wide variety of methods to trap or poison rodents have been developed in the past. A most common type of trap used for trapping mice and small rats is in the form of a trigger-released spring trap which smashes the back or neck of the rodent upon release. These traps are reuseable, but the removal of the trapped rodent is distasteful to many persons. In addition, spring traps of this type pose a real threat of injury to domestic pets and small children. Consequently, their use is generally restricted to places where such pets and children do not have access.

Another approach which is commonly used to eliminate rodents is to spread posioned bait in areas which are known to be frequented by the rodents. As with the spring trap, however, the use of poisoned bait must be carefully controlled to prevent access to the bait by small children or pets to prevent serious harm from unwanted contact with the poisons. Another disadvantage of using poisons or poisoned bait is that the rodents do not die instantly, but tend to crawl into inaccessible places to hide where they ultimately die. The bodies then decay and produce an extremely offensive odor which frequently cannot be eliminated because of the inaccessibility of the location in which the rodent has died.

Other efforts to trap and kill undesirable rodents have led to the use of reuseable traps having a sealed chamber which closes upon entry of the rodent into the trap to thereafter suffocate the rodent. After the suffocation is complete, the rodent may be removed from the trap and it then may be reused. While traps of this type do not create any health hazzard to pets or children, the relative complexity of the trap and, again, the necessity of removing the rodent from it for reuse has significantly limited the commerical application and use of such traps.

In recent years, various types of tacky resins which retain a fairly consistent degree of tackiness over a long storage period have been employed in the development of rodent and insect traps with a fairly high degree of success. Such traps, when employed as rodent traps, generally utilize a layer of the tacky glue-like resin on the floor of the trap, with some provision for enticing the rodent into the trap. Once the rodent steps onto the tacky glue-like material, it becomes entrapped in it and subsequently dies. The entire trap then may be disposed of or a provision is sometimes made for simply removing the floor of the trap containing the glue-like resin and the entrapped rodent from the trap. A new floor then is put in place for reuse of the trap.

In its simplest form, a sticky glue trap comprises an open tray with the glue-like material placed in it. A trap of this type then is placed along a wall or baseboard in an area known to be frequented by mice or rats. During the night when the mice or rats are running along the wall, they run onto the surface of the trap and become caught. They die within a short period of time and the trap containing the rodent then may be disposed. As with many of the other traps mentioned above, the disposal is often quite unpleasant; because the dead rodent is in full view during the disposal of the trap and rodent.

A variety of traps with sticky glue or tacky resin floors in them for entrapping rodents within an enclosure also have been developed in the past. Three such traps are disclosed in the patents to Otterson, U.S. Pat. No. 4,244,134, Pearsall, U.S. Pat. No. 3,398,478, and Hughes, U.S. Pat. No. 2,962,836. The Otterson patent discloses a variety of shapes of open-ended housings with a sticky floor located in a central area of the housings to entrap rodents which run through the housing. Once the rodents engage the sticky floor they become caught in it and subsequently die. The entire trap then may be disposed. The open ends, however, do not permit concealment of the trapped rodent during the disposal of the trap; so that the unpleasant sight of the dead rodent still is present during the picking up and removal of the trap.

The trap disclosed in the Hughes patent is subject to all of the disadvantages, insofar as the removal and disposal of entrapped rodents is concerned, as are present in the open tray glue traps which have been discussed previously. In Hughes, a number of sticky floor bases are stacked upon one another with a removable cover placed over the entire stack. Whenever a rodent becomes entrapped on the top layer or top floor, the cover is removed and the floor with the entrapped rodent on it is lifted off and thrown away. The rodent is in full view during this disposal operations; so that the trap is quite similar with respect to this use as the open tray type of trap.

The Pearsall patent is a snare in the form of a tubular member flattened on its bottom to provide an enclosed pathway. The tube may be of a variety of cross sectional configurations. It is dimensioned to vary in accordance with the size of the rodents to be entrapped and has a width which is considerably less than the length of the rodent but greater than the rodent's width. This is done to permit free movement of the rodent along the pathway which has no adhesive or glue on it. The walls of the tube, however, are coated internally with an adhesive. Bait is placed at the closed end of the tube; so that an unimpeded pathway to the bait adjacent the closed end is provided. After the rodent has entered the snare and has reached the bait end, it becomes entrapped in the adhesive on the walls of the trap when it turns around to leave. Consequently, the rodent is caught adjacent the closed end of the tube; and the entire snare and rodent may be disposed of in any suitable manner. The relatively narrow confines of the Pearsall snare which must be used to ensure that the rodent is caught when it turns around to leave may in many cases serve as a warning or a caution to the rodent which may make it reluctant to enter the trap. Furthermore, the tubes must be dimensioned in accordance with the various sizes of the rodents to be trapped; and a small rodent conceivably can reach the bait and leave a large tube without becoming trapped.

Another type of rodent trap using a rubberized glue or similar sticky surface on the floor of the trap is disclosed in the patent to Hill, U.S. Pat. No. 4,161,079. The trap of the Hill patent, like various others of the traps described above, is an open-ended housing with a floor covered with tacky glue material. In Hill, not only is the end open, but slits or viewing windows are provided in the top cover of the trap to permit inspection to see whether a rodent is entrapped therein. The structure of the Hill trap is a multipart structure which causes it to be relatively expensive for a disposable trap. This, in many applications, would constitute a limitation on the extensive use of such a trap as disclosed in this patent.

Various types of cockroach traps also have been employed in the past utilizing a sticky glue floor material for entrapping the insects for subsequent disposal. Traps of this nature, either in the form of an open sheet or open-ended boxes, are disclosed in the patents to Nishimura, U.S. Pat. No. 3,913,259, Hall, U.S. Pat. No. 4,208,828, and Carr, U.S. Pat. No. 3,908,302. Because of the relatively small size of roaches, it is possible to produce open-ended roach traps with a sticky floor base located inside the trap which are not nearly as disagreeable to dispose of as is the case of the open-ended rodent traps typified by the patents discussed above. The roach traps, however, are of interest since some of the same general overall features of construction used in rodent traps are also employed in the roach traps.

In view of the foregoing, it is desirable to employ the concept of a sticky glue trap for capturing rodents, such as mice and rats, which does not have the disadvantages of the various prior art devices mentioned above. For example, such a trap should be simple and easy to manufacture. It should not require controlled dimensions and a provision should be made for permitting disposal of the trap without subjecting the person making such a disposal to the objectionable viewing of the entrapped rodent.

SUMMARY OF THE INVENTION

Accordingly, it is an object of this invention to provide an improved rodent trap.

It is another object of this invention to provide an improved disposable rodent trap.

It is an additional object of this invention to provide an easily disposable rodent trap which does not subject the person making such a disposal with an unpleasant view of the entrapped rodent.

It is a further object of this invention to provide a harmless disposable rodent trap which serves as an enclosed container for disposal of a rodent entrapped therein.

The foregoing and other objects of the invention are attained in a preferred embodiment in the form of a rodent trap enclosure. A main base member of this enclosure has first and second spaced upstanding end walls attached to it. A cover member is attached to the first and second end walls and overlies the base member. A side wall extends between the two end walls and the cover member and the base member with at least the upper edge of the side wall attached to the cover member. An opening is provided in at least one of the end walls adjacent the junction of the side wall and the base member. A moveable floor member overlies the base member in a first position adjacent the opening in the side wall and is dimensioned such that it may be moved from this first position to a second position offset from the opening in the end wall.

In a more specific embodiment, the moveable floor member is hingedly connected to the bottom edge of the side wall; so that when the floor member is moved to its second position, the side wall moves past the opening in the end wall to form an enclosed chamber with the remainder of the enclosure between the opening in the end wall and the other side of the enclosure opposite the hinged side wall.

BRIEF DESCRIPTION OF THE DRAWINGS

FIG. 5 is a plan view of a blank of material used to form the embodiment shown in FIGS. 1 through 4.

DETAILED DESCRIPTION

Figure 1:
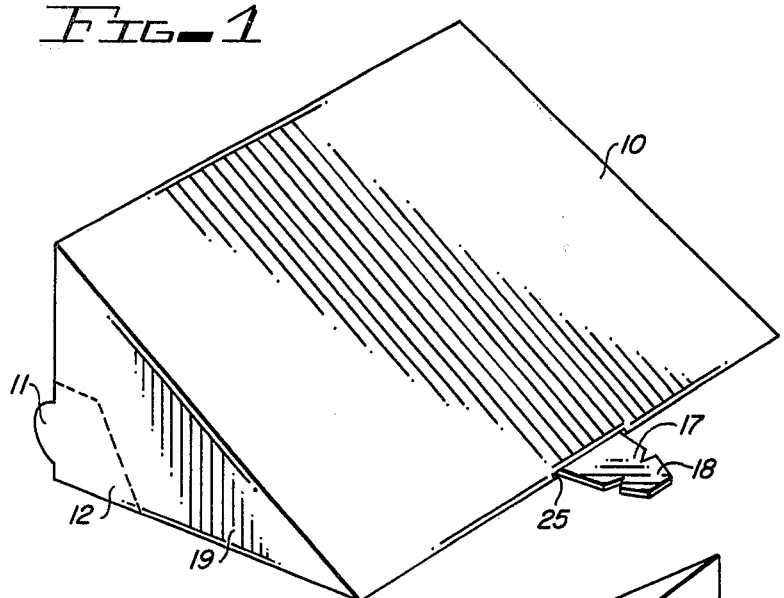
FIG. 1 is a front perspective view of a preferred embodiment of the invention.

Reference now should be made to the drawings in which the same reference numbers are used throughout the different Figures to designate the same components. The drawings depict a preferred embodiment of a disposable rodent trap or mouse trap made in accordance with the invention. The trap is made from a single piece or blank of pliable, bendable material, such as cardboard or the like. This blank is shown in its flattened state in FIG. 5. When it is folded together in the assembled state, the blank assumes the configuration shown most clearly in FIGS. 1 and 2.

The assembled disposable trap is in the form of a right triangular wedge-shaped enclosure having a base floor 13 between a pair of spaced-apart right triangle side walls 19. The side walls are attached to and are folded downwardly from a cover or top 10, which also is attached at its forward edge, at the point of the wedge, to the base 13. A rear side wall 14 is folded downwardly from the top 10 to assume a position between the vertical edges of the side walls 19, as shown most clearly in FIGS. 2 and 4A. A moveable or auxiliary floor 16, which has a transverse width less than the width of the main base 13, is attached by a fold line to the lower edge of the rear side wall 14.

Figure 2:
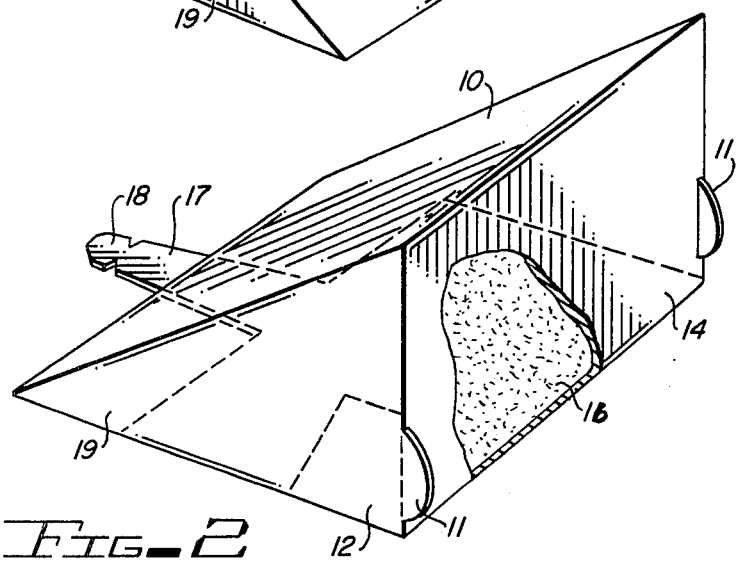
FIG. 2 is a partially cut-away rear perspective view of the embodiment shown in FIG. 1.
Figure 3:
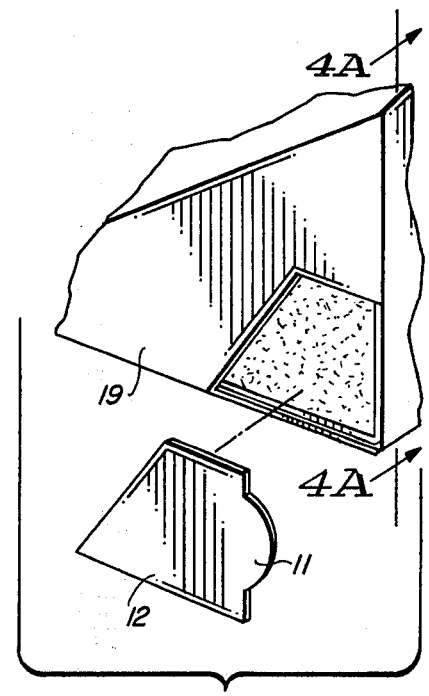
FIG. 3 is a detailed view of a portion of the embodiment shown in FIG. 2 illustrating a feature thereof.
Figure 4A:
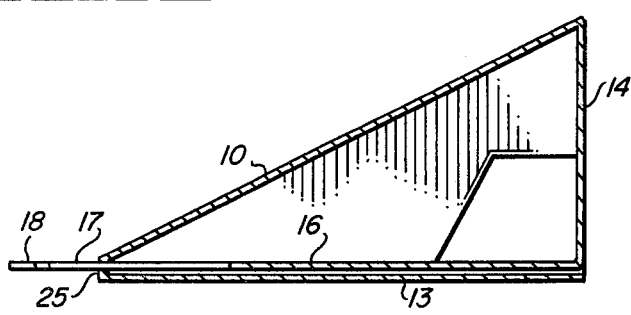
FIG. 4A is a cross-sectional view taken along the line 4A—4A of FIG. 3.

To permit movement of the moveable floor 16 from the position shown in FIGS. 2, 3 and 4A to a second position for disposal of the trap after it has been used, an elongated tongue 17 is attached to the forward edge of the moveable floor 16 and extends through a slot 25 located at the juncture of the edge of the base 13 and the top cover 10. The portion which extends outside of the slot 25 when the trap is in its ready-to-use assembled configuration includes a tab 18 having a size which permits it conveniently to be grasped between two fingers to pull the tongue 17 outwardly through the slot 25. The trap is completed by coating the top surface of the moveable floor 16 with a sticky glue substance of the general type which is discussed above in conjunction with various devices in the "background" section of this description.

Reference should be made to FIG. 5 for an understanding of the manner in which the disposable trap shown in the assembled forms of FIGS. 1 through 4B is assembled from the blank shown in FIG. 5. The central portion of the blank comprises the top or cover 10. In assembling the trap, the dotted fold lines shown on each side of this rectangular top are folded upwardly out of the plane of the paper, as the blank is viewed in FIG. 5. The base member 13 (the inside surface of which is seen in FIG. 5) is folded back at an acute angle to align with the dotted fold line between the sections 19 and 15 shown on each of the side members of the blank in FIG.

5. The members 15 then are folded over the outside of the base 13 and are glued to it to provide the rigidity for the trap. This is the only place where the parts of the trap are fastened together in any manner. The rear side wall 14 is folded vertically out of the plane of the paper shown in FIG. 5 to align with the edges of the end walls 19 having the tabs 11 extending out of them. The junction between the moveable floor 16 and the side wall 14 is folded again at a ninety degree angle which causes the floor 16 to overlie the base 13. The tab 18 then is extended out of the slot 25 to the position shown in FIG. 1. Before this assembly, the floor 16 is coated with the sticky glue-like substance to prepare the trap for use. This is indicated by the stipling of this area in FIG. 5.

When the trap is assembled, the sticky surface on the floor 16 is protected from being touched by the removable sections 12 located at what becomes the junction of the rear side wall and the base 13 at the right angle corner of each of the end walls 19. The heavy dotted lines which outline the sections 12 in FIG. 5 are perforated score lines made in the blank prior to assembly of the trap from the blank.

At the time the trap is set up for use, the sections 12 are removed from each of the side walls 19 by grasping the tabs 11 and tearing the sections out along the indicated score lines shown in FIGS. 1, 2 and 5. This removal is illustrated in detail in FIG. 3. With the removable sections 12 taken away, the trap is ready for use and may be placed against a wall, the back of a cupboard, or any area known to be frequented or suspected to be frequented by mice or other rodents. To further attract rodents into the trap, a suitable bait, such as peanut butter, grain or other known bait material, may be placed in the middle of the sticky floor 16.

As with other sticky glue-types of traps, once a rodent enters the trap either simply by running through it or in response to the attraction of the bait placed in it, it becomes caught by the sticky material on the moveable floor 16. The rodent is unable to leave the trap; and within a short period of time, it dies.

Figure 4B:
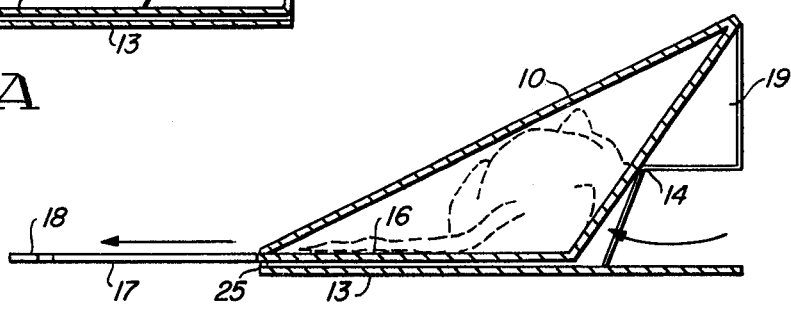
FIG. 4B is a cross-sectional view of the parts shown in FIG. 4A in a second position thereof.

After the rodent becomes entrapped in the sticky material coating the surface of the moveable floor 16, the tab 18 is pulled from the position shown in FIGS. 1, 2 and 4A outwardly through the slot 25 to withdraw the tongue 17 to the position shown in FIG. 4B. Since the rear side wall 14 is hinged (by way of the fold line) at its upper edge to the upper edge of the top cover 10, and similarly at its lower edge to the moveable floor 16, the side wall 14 moves toward the left as viewed in FIGS. 4A and 4B to the position shown in FIG. 4B. In this position it is located just past the left-hand edge of the openings formed by the removal of the tabs 12. Consequently, any rodent trapped inside the trap is completely enclosed away from view. A dead trapped rodent is illustrated in dotted lines in FIG. 4B. In this position, the rodent is in a completely enclosed chamber; so that during the disposal of the trap with the rodent inside it, no unpleasant viewing of the body of the rodent is possible. Furthermore, the tab 18 and tongue 17 provide a convenient handle for movement and disposal of the trap after it has served its purpose.

The foregoing description of a preferred embodiment of the invention should be considered as illustrative of the invention and not limiting. Various modifications and changes will occur to those skilled in the art without departing from the true scope of the invention. For example, the trap may be made in the form of an enclosed box rather than the wedge-shaped trap which is illustrated. The moveable back wall and moveable floor would still function in the same manner as described above in conjunction with the embodiment shown in the drawings. Various other changes and modifications will occur to those skilled in the art without departing from the scope of the invention.

I claim:

1. A trap for rodents comprising an enclosure including in combination:
   a main base member;
   first and second spaced-apart upstanding end walls attached to said base member;
   a cover member attached to said first and second end walls and overlying said base member;
   a side wall extending between said first and second end walls and said cover member and said base member with the upper edge thereof hingedly attached to said cover member, with an opening in said first end wall adjacent the junction of said side wall and said base member;
   a moveable floor member overlying said base member in a first position adjacent the opening in said first end wall, the lower edge of said side wall being hingedly attached to said moveable floor member, wherein in the first position of said moveable floor member said side wall extends substantially vertically from the edge of said main base member to said cover member; and
   means for moving said moveable floor member from said first position to a second position offset from the opening in said first end wall.

2. The combination according to claim 1 wherein said moveable floor member has adhesive means located on at least a portion thereof.

3. The combination according to claim 2 wherein the transverse dimension of said moveable floor member is less than the transverse dimension of said base member, and in said first position the adhesive means on said moveable floor member is opposite the opening in said first end wall and in said second position is offset from such opening.

4. The combination according to claim 3 wherein said first and second end walls have a substantially right angle triangular configuration with said cover member joining the edge of said main base member opposite said side wall to form a wedge shaped enclosure.

5. The combination according to claim 4 wherein said means for moving said floor member comprises a tab attached to said moveable floor member in the same plane therewith and extending through a slot formed at the juncture of said cover member with said main base member for movement into and out of such slot in a direction parallel to the planes of said first and second end walls.

6. The combination according to claim 5 wherein the movement of said moveable floor member to said second position is such that said side wall moves from a first position, which permits access by a rodent through the opening in said first end wall onto said moveable floor member, to a second position where said side wall is located on the opposite side of such opening in said first end wall to reduce the interior space of said enclosure and to seal off such reduced space from the opening in said first side wall.

7. The combination according to claim 6 including openings in said first and second end walls in alignment with one another and adjacent the junction of said side wall and said base member.

8. The combination according to claim 7 wherein said main base member, said first and second end walls, said cover member, said side wall and said moveable floor member all are made from a single blank of a pliable, bendable material.

9. The combination according to claim 8 wherein the openings in said first and second end walls are formed in said blank by perforating a portion of said blank for subsequent removal after said blank is assembled to form said enclosure.

10. The combination according to claim 3 wherein the movement of said moveable floor member to said second position is such that said side wall moves from a first position, which permits access by a rodent through the opening in said first end wall onto said moveable floor member, to a second position where said side wall is located on the opposite side of such opening in said first end wall to reduce the interior space of said enclosure and to seal off such reduced space from the opening in said first side wall.

11. The combination according to claim 10 including openings in said first and second end walls in alignment with one another and adjacent the junction of said side wall and said base member.

* * * * *